Nov. 23, 1937.  F. M. COWAN  2,100,183
METHOD AND APPARATUS FOR INITIATING TEMPERATURE RISE ALARMS
Filed Feb. 24, 1932
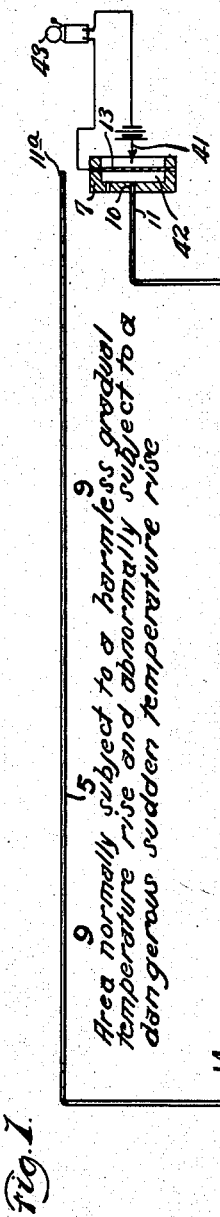
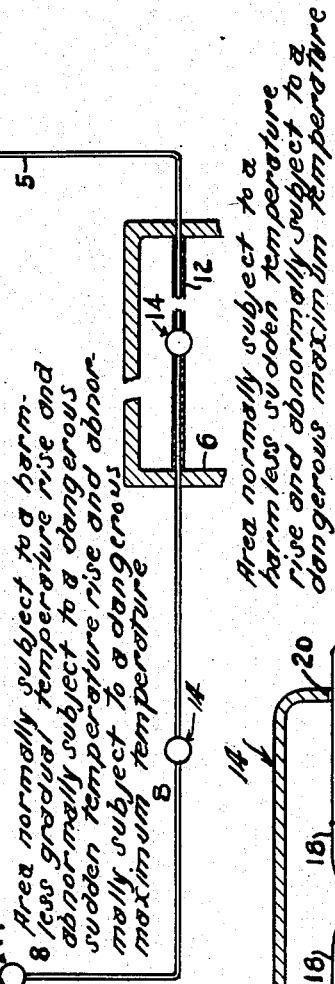
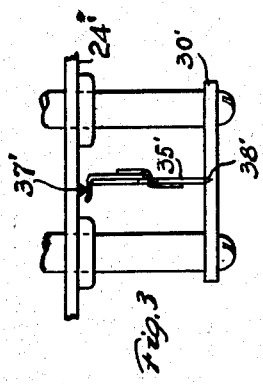
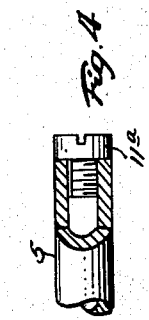
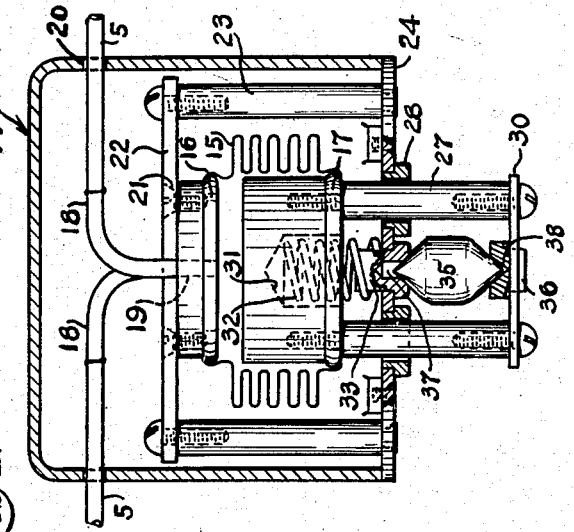
INVENTOR:
Frank M. Cowan,
BY
Harold D. Penney, ATTORNEY.

Patented Nov. 23, 1937

2,100,183

UNITED STATES PATENT OFFICE 2,100,183

METHOD AND APPARATUS FOR INITIATING TEMPERATURE RISE ALARMS

Frank M. Cowan, Plainfield, N. J., assignor to American District Telegraph Company, New York, N. Y., a corporation of New Jersey Application February 24, 1932, Serial No. 594,875

15 Claims. (Cl. 177—355)

This invention relates to methods and apparatus for sending alarms or signals and more particularly to fire alarm systems of the heat sensitive expansive fluid tube-circuit type, though it is noted that the invention is not limited to alarms nor in some respects even to expansive fluid.

One object of the invention is to provide an apparatus of this kind in which the alarm system will not function until a predetermined temperature is reached.

Another object of the invention is to provide an apparatus or device of this kind just stated which will not send an alarm due to a sudden rise in temperature unless said predetermined temperature is reached.

Another object of the invention is to provide an apparatus or device of this kind which will send an alarm either on a sudden rise or the slow obtainment of a predetermined temperature or both.

More specifically stated the object of the main invention is to provide a means whereby an operative pressure will be produced in a rate of rise tube system when the temperature in the protected area reaches a given point.

This device is useful in areas where temperature changes sufficiently rapid to cause the operation of a normally adjusted heat responsive tube system are likely to occur more or less frequently.

Typical of such areas are boiler or furnace rooms and in such cases means such as insulation is provided to prevent a pressure rise in the tube circuit until the temperature reaches the predetermined point, irrespective of the rate at which it changes.

Heretofore in attempting to overcome such conditions, the sensitivity of the heat responsive medium was reduced by various means, to prevent the operation of the system with the internal pressure produced by the sudden rise of temperature. This is objectionable in that it lowers the heat sensitivity of the system generally, to overcome the effect of a local condition.

Other objects of the invention are to improve generally the simplicity and efficiency of such methods and apparatus and to provide a device or apparatus of this kind which is economical, durable and reliable in operation, and economical to manufacture and install.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved detector system which, briefly stated, includes a bellows communicating with the detector-system tube and tending to contract under the action of a spring; and means for holding the bellows against contraction and including a holding element adapted to be disabled by any dangerous temperature to allow the bellows to contract and send enough air into the tube to raise the pressure enough to operate the alarm system.

In the accompanying drawing showing, by way of example, one of many possible embodiments of the invention, Fig. 1 is a diagram of a part of a system showing locations of the bellows;

Fig. 2 is an axial vertical sectional view, partly in elevation, showing the bellows, the holding element being a fluid filled glass bulb;

Fig. 3 shows a portion of the holding means, the holding element being a fusible strut; and Fig. 4 is a longitudinal central section of an end of the tube showing a well known plug.

This invention is shown for combination with a fire-detector tube-circuit system operative by sudden increase in tube-pressure, and inoperative for gradual increase, and having a tube circuit comprising a tube 5 for protecting an area, such for instance as a furnace room 6, normally subject to harmless sudden temperature rise, and abnormally subject to a dangerous maximum, as in case of an outbreak of fire.

If desired the tube may also be used for protecting areas 8, 9 which may be subject normally to harmless normal gradual rises, and not subject to sudden rises as in said area 6, but abnormally subject to dangerous sudden rise, the areas 8 being also protected against dangerous maximum, as in case of fire. The system used as with either areas 6, 8 or 9 alone or in combination and may also, as heretofore, be used to protect areas 9 normally subject only to harmless gradual rise and harmless maximum, and abnormally subject to dangerous sudden rise.

In said area 6 of normal sudden rise, there is shown insulation 12 around the tubing, to prevent response by the system to said sudden rises as when the furnace door is opened. In any one or more or all of areas such as areas 6 and 8 there are provided means 14 operative by said dangerous maximum for suddenly increasing the pressure in the tube when said dangerous maximum is reached thereby to operate the system. This constitutes the main object of the invention.

Details of the device are shown in Fig. 2. The active element is a metallic bellows 15, sealed at both heads 16, 17, the interior communicating with the tube circuit through brazed sleeve connections 18 in bores 19 in the upper head 16. A quartz bulb is shown in Patent No. 1,797,919 issued Mar. 24, 1931, to Loepsinger.

The bellows is assembled on the inside of an inverted-cup-shaped housing 20, the upper bellows head 16 being rigidly fastened by screws 21 to an upper plate 22 carried on pillars 23 mounted on a lower cover plate 24 secured to the lower edge of the housing.

The lower head 17 is provided with two tapped holes into which two brass guide rods 27 are threaded, these rods projecting through bushings 28 secured in holes in the cover plate 24, and being fastened together with a brass strap 30 at their lower end.

A circular recess 31 in the lower head houses the upper end of a helical compression spring 32, the lower end of which rests on the inside of the cover, being positioned by the upwardly projection end of a flanged seat block 33 disposed in a central hole of the cover plate. Thus it is seen that the apparatus is assembled on the cover 24 and may be readily removed for connecting to the tube leads.

With the device in its normal condition, the stirrup formed by the guide rods 27 and strap 30 is held in the position shown in the drawing by a quartz bulb 35 inserted between said block 33 and a seat block 36 carried by the strap 30, countersunk holes 37, 38 being provided in these blocks to position the bulb.

As shown in Fig. 3, instead of the quartz bulb, a fusible metal strut 35' is inserted between the strap 30' a projection 37' on the outer surface of the cover 24', a small hole 38' being provided to receive the lower end of the strut.

In this condition the spring 32 is compressed, and the bellows 15 extended to the limit of its outward stroke. Being enclosed in its iron housing 20, the bellows is sufficiently insulated from any heat condition in the area in which it is installed.

When the heat reaches the maximum for which the bulb is designed, the bulb is fractured, or the strut fused, releasing the stirrup, and the bellows is compressed to the limit of its inward stroke by the action of the spring. The air in the bellows is forced into the tube circuit, raising the pressure in the latter to a degree, determined by the volume of air displaced, sufficient to operate the alarm.

Patent No. 966,904, dated August 9, 1910, and issued to A. Goldstein, discloses an alarm circuit closing means such as may be used with the present apparatus.

One end 11 of the tube 5 enters an aperture 10 in a disc 7 of insulating material. Held in a marginal rim of this disc is a diaphragm of conductive material 13, from which one end of the wiring of the circuit extends. The circuit, receiving current from a source, as shown, has its other end 41 disposed adjacent the diaphragm, so that on release of the stirrup 27, 30, when the holding member, as 35, is destroyed, the bellows may be effective to urge an air impulse through the bore of the tube, into a thin or restricted air space 42 in the disc, whereby to move the diaphragm and close the circuit at the terminal 41, for operating an annunciator 43 in the circuit.

The other end of the tube may be closed as by any well known plug or cap 11a, a threaded portion of which is threadedly held in said end, as shown.

I claim as my invention:

1. In a fire-detector-tube system operative by sudden increase in interior tube-pressure, and inoperative for gradual increase and including a tube for installation adjacent to an area normally subject to harmless sudden temperature rise, and abnormally subject to a dangerous maximum, heat insulation around the tube in said area to prevent response by the system to said sudden rise; and means in said area, operative by said dangerous maximum for suddenly increasing the pressure in the tube when said dangerous maximum is reached.

2. In a fire-detector-tube system operative by sudden increase in interior tube-pressure, and inoperative for gradual increase, a tube passing through areas normally subject to harmless sudden temperature rise, and abnormally subject to a dangerous maximum temperature, and areas normally subject to harmless normal gradual rises, and abnormally subject to dangerous sudden rise and a dangerous maximum; heat insulation around the tubing in said area of normal sudden rise, to prevent response by the system to said sudden rises; and individual means in said areas operative by said dangerous maximum for suddenly increasing the pressure in the tube when said dangerous maximum is reached.

3. In combination, upper and lower plates; pillars connecting said plates; a bellows having one head secured to the upper plate and having one head movable toward the lower plate; the lower plate having openings therein; rods secured to the lower head and passing downwardly through said openings; a strap secured to the ends of the rods; a spring compressed between the lower plate and lower head; and a member, adapted to be disabled by heat and interposed between said strap and lower plate to hold the spring compressed so that when a predetermined temperature is reached said member may be disabled to permit the spring to move said lower head.

4. In combination, a fluid container including a head having a discharge passage, a base opposite said head, interposed resilient walls connecting said head with the base; means rigid with said head and having a plate outside of said base, said plate having therein openings; guide rods rigid with said base and being slidably disposed in said openings, a cross member connecting the outer ends of said rods, and heat sensitive destructible material disposed between said member and said plate, said walls being held extended by said material, so that the latter may be destroyed when a predetermined temperature is reached, whereby said walls may contract to suddenly discharge fluid through said passage.

5. In combination, a series of pressure initiating devices each including a pressure changing means and a device for operating the means; and tubes connecting said means in series, adjacent ends of different tubes separately entering into and communicating with said means; whereby testing air may pass through all the means only when communication between the tube and the means is unobstructed.

6. In combination, a series of pressure initiating devices each including a bellows and a device for operating the bellows; and tubes connecting said bellows in series, adjacent ends of different tubes separately entering into and communicating with the bellows; whereby testing air may pass through all the tubes only when communication between the tube and the bellows is unobstructed.

7. In combination, a series of pressure initiating devices each including a bellows and a heat operated device for compressing the bellows; and tubes connecting said bellows in series, adjacent ends of different tubes separately entering into and communicating with the bellows; whereby testing air may pass through all the tubes only when communication between the tube and the bellows is unobstructed.

8. In combination, a single tube of a detector system adapted for operation by increase of pressure in the tube caused by the warming and expansion within the tube of air confined in the tube caused by the conduction of heat through the tube from a source exterior to the tube; and a heat responsive means set in operation by heat exterior to the tube for suddenly forcing a charge of air into the tube for quickly increasing the pressure in the tube for causing a signal operating air-impulse to pass along the tube.

9. A fire detector system comprising an alarm; and means inoperative by gradual temperature rise and operative by sudden temperature rise for operating said alarm; and means operative by a temperature rise to an excessively high temperature for causing said means to operate the alarm.

10. In a fire-detector-tube system operative by sudden increase in interior tube-pressure, and inoperative for gradual increase and including a tube having a portion adapted for installation adjacent to an area normally subject to harmless sudden temperature rise, and abnormally subject to a dangerous maximum temperature, means at said portion to prevent response by the system to said harmless sudden rise; and means at said portion operative by said dangerous maximum temperature in said area for suddenly increasing the pressure in the tube when said dangerous maximum is reached.

11. In a fire-detector-tube system including a pressure tube and operative by sudden increase in interior tube pressure caused by sudden increase in heat at the exterior of the tube and inoperative by gradual increase in interior-tube pressure caused by gradual increase in heat at the exterior of the tube; and a device operative by excessively high temperature within a limited area, for suddenly increasing the pressure in said tube; and means for preventing heat in said area from heating the exterior of the tube.

12. In a single detector system operative by pressure increase, the combination of a single tube having a small vent to prevent operation by slow increase of pressure in the tube caused by weather changes; a bellows communicating with the tube; and a heat responsive means set in operation by high heat of dangerous fire exterior to the tube for suddenly causing said bellows to compress and force a charge of air into the tube for causing quick increase in pressure in the tube for causing a signal operating air-impulse to pass along the tube, the vent being small enough to allow said increase.

13. In a single detector system operative by pressure increase, the combination of a tube having a small vent to prevent operation by slow increase of pressure in the tube caused by weather changes; and a heat-responsive means communicating with the tube and set in operation by high heat of dangerous fire exterior to the tube for forcing into the tube a small predetermined amount of gas for causing quick increase in pressure in the tube for causing a signal operating impulse to pass along the tube, the vent being small enough to allow said increase; said tube being heat-conductive whereby said heat increases the pressure in said tube; said increases adding said pressure so that said pressures cooperate to hasten operation.

14. In combination, a series of pressure initiating devices each including a chamber and pressure exerting means having at the interior of the chamber a part for exerting pressure on air in the chamber to raise the pressure of the air within the chamber; and tubes connecting the interior of said chambers in series, adjacent ends of different tubes separately entering into and normally communicating with each chamber; said chamber being normally free of air-obstructing means between said part and ends; whereby testing air may normally pass through all the tubes and to said part.

15. In combination, a series of pressure initiating devices each including a chamber including pressure-exerting means at the interior of the chamber for raising the pressure of the air within the chamber; and tubes connecting the interior of said chambers in series, adjacent ends of different tubes separately entering into and normally communicating with each chamber; said chamber being free of air-obstructing means between the exerting means and said ends; whereby testing air may pass through all the tubes only when communication between the tube and the chambers is unobstructed.

FRANK M. COWAN.